United States Patent Office 2,956,063
Patented Oct. 11, 1960

2,956,063
PROCESS FOR THE MANUFACTURE OF XANTHENE CARBOXYLIC ACID DERIVATIVES

Richard Baltzly, Tuckahoe, N.Y., and Emil Lorz, Springfield, Mo., assignors to Burroughs Wellcome & Co. (U.S.A.) Inc., Tuckahoe, N.Y., a corporation of New York No Drawing. Filed July 24, 1958, Ser. No. 750,589

7 Claims. (Cl. 260—335)

The present invention relates to the preparation of xanthene-9-carboxylic acid which is an intermediate of considerable value in the pharmaceutical industry. Among other compounds, the important spasmolytic substances Banthine and NeoBanthine are esters of xanthene-9-carboxylic acid. The spasmolytics described in U.S. Patent 2,742,472 are amides of this acid. Published methods for its preparation involve variations of the carbonation of a 9-metallic derivative of xanthene (such as the potassium and lithium derivatives). These procedures, involving as they do the use of alkyl lithium derivatives or of sodium-potassium alloy, are inconvenient, and on a technical scale may be dangerous.

It has been found that under suitable conditions the hydroxyl group of xanthydrol may be replaced by a cyanide ion, permitting the preparation of xanthene-9-carboxylic acid by the following sequence:

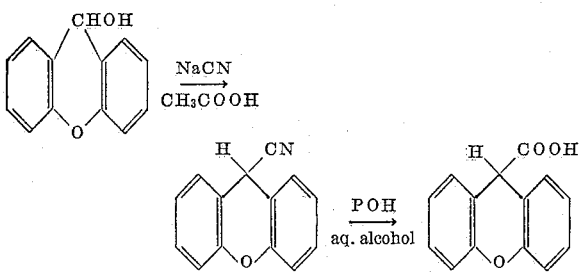

Accordingly, the present invention comprises a process for preparing xanthene-9-carboxylic acid wherein the hydroxyl group of xanthyrol is replaced by a cyanide group and the resulting nitrile hydrolyzed. The nitrile can also be isolated, purified and employed in condensation reactions since it is in effect a substituted diphenylacetonitrile and can be used in the same fashion as that substance, e.g.:

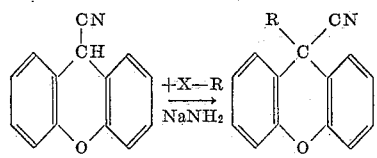

The invention embraces therefore the nitrile itself as well as the method of preparing it and through it of preparing xanthene-9-carboxylic acid.

Exchange reactions of halides with cyanide ion are familiar and are frequently conducted at temperatures between 0° and 100° C. Exhange reactions of hydroxyl with cyanide (conversion of alcohols to nitriles) are normally much less facile and require drastic conditions of pressure and temperature. We have found that xanthydrol has the remarkable property of undergoing this reaction under conditions no more severe than are normally required for exchange reactions of halides. The conditions permitting this reaction are quite restricted, even more so than the exchange reactions of cyanides generally. Alkali cyanides in general have to be employed in solvents consisting at least partially of hydroxylic substances. The present reaction requires further that the hydroxylic substance should be a carboxylic acid, liquid at the temperature used. Because of cheapness and convenience acetic acid is the preferred carboxylic acid. The cyanide employed is conveniently sodium cyanide but potassium cyanide is equally satisfactory. The cyanide may be used in excess to ensure completeness of reaction, but it need not be.

The temperature range employed is not especially critical. Temperatures as high as 100° may be used but they are not required. The reaction proceeds at an appreciable rate even at room temperature and above 50° is definitely exothermic. The prefererd procedure is to warm the reaction to about 50°, let it run by itself until the temperature begins to drop, and thereafter maintain it at 50–60° for a few hours. The cyanide may be used in excess in order to improve the yield but need not be.

Alternatively, it is feasible to charge the reaction vessel with liquid hydrogen cyanide in place of sodium cyanide, but this involves a certain hazard and offers no particular advantage. Substitution of potassium cyanide for sodium cyanide (in equivalent quantity) is of no consequence. It is also possible to add mineral acid to the reaction mixture but since this is heavily buffered (being, after a short time, a solution of alkali acetate and hydrogen cyanide in acetic acid) the presence of mineral acid less than the equivalent of the added cyanide has little effect. Significantly larger amounts of mineral acid result in poorer yields but a 20% yield of product has been obtained even in the presence of thrice the quantity of sulfuric acid required to neutralize the cyanide.

When the reaction is complete and the reaction-mixture has cooled, a large part of the nitrile crystallizes from the solution. It can be filtered off (under a hood) and washed with cold water which precipitates more nitrile from the mother-liquors. The nitrile so obtained can be crystallized from ether-petroleum ether and then melts at 98° C.

Alternatively the crude nitrile can be hydrolyzed directly thereby yielding xanthene-9-carboxylic acid.

The xanthdrol required for the reaction can be prepared by a number of methods from xanthone. The least expensive method of preparation is to reduce xanthone with zinc dust and alcoholic alkali. This gives about an 80% yield of material sufficiently pure for synthetic purposes. The purification of xanthydrol is rather difficult and the melting-point of that substance is inadequate as a criterion of purity. Such xanthydrol normally contains a small amount of xanthone which can be separated later from nitrile by its lower solubility in ether, or from xanthene-9-carboxylic acid by the obvious method. Hydrolysis of the nitrile may be under acid or alkali conditions; however, alkaline hydrolysis in alcoholic solution is preferred since it gives an automatic separation from impurities (unreacted xanthydrol and xanthone present in the crude xanthydrol used in the reaction). Acid hydrolysis in alcoholic solution converts some of the nitrile to xanthene carboxylic ester which must be hydrolyzed separately. For the hydrolysis sodium and potassium hydroxides are equally effective. Hydrolysis by aqueous-alcoholic alkali results first in formation of a precipitate (amide) which gradually redissolves. When hydrolysis is judged complete, the alcohol is boiled off, the solution is diluted and is extracted with ether. On acidification the acid precipitates and can be collected, dried and used directly or can be crystallized from ether-petroleum ether mixtures or from aqueous alcohol. The following examples give the details of a preparation, in which temperatures are given in degrees centrigrade,

Example I

A mixture of 19.8 g. (0.1 mole) of xanthydrol, 10.4 g. of sodium cyanide and 80 ml. of cold glacial acetic acid was charged into a steel bomb. The bomb was closed and heated at 100° for 24 hours. It was then cooled and opened. The largely solidified reaction mixture was transferred to a beaker containing half a litre of ice-water and the solid that precipitated was filtered off and washed with one litre of cold water in portions. When dried in vacuo the cream-colored product weighed 18 g. It was dissolved in 200 ml. of 75% methanol containing 20 g. of potassium hydroxide and heated under reflux for 24 hours on the steam bath. A bulky precipitate separated after the first half hour of heating and gradually dissolved (solution was complete in about six hours). The condenser was then removed, the greater part of the methanol was boiled off and the residue was cooled. Water was added to give a volume of about 300 ml., a small amount of solid was filtered off, and the cold aqueous layer was then extracted twice with ether. The cold aqueous layer was then acidified strongly with hydrochloric acid, and the precipitated solid was taken into ether, dried over sodium sulphate and after addition of about 100 cc. of hexane, the mixture was evaporated. The solvent was removed completely on the steam bath. The residual acid weighed 15.5 g. (68-9% of the calculated yield) and melted at 218–220°. It was at this stage suitable for synthetic work as is also the acid when first precipitated and separated by simple filtration. The melting point can be raised a few degrees by recrystallization from ether-hexane mixtures or from aqueous alcohol.

Example II

Ten g. (0.05 mole) of xanthydrol, 7.5 g. of 95% sodium cyanide (0.06 mole), 40 cc. of glacial acetic acid and 10 g. of concentrated sulfuric acid (0.1 mole=0.2 eq.) were charged into a cooled, glass-lined steel bomb. The bomb was closed and heated on the steam bath for seven hours, and allowed to cool overnight.

On opening the contents of the bomb were removed, mixed with ice water and filtered. The collected solid weighed about six g. and this diminished on washing with water to 2.5 g. The solid and the washings were hydrolyzed separately by refluxing with alcoholic potash (80% alcohol, 10% KOH). The hydrolysis of the washings yielded nothing of interest but the hydrolysis of the solid gave, after filtration and acidification, 2.2 g. of xanthene carboxylic acid. This is approximately a 20% yield.

Example III

Forty g. (0.2 mole) of xanthydrol was dissolved in 200 cc. of glacial acetic acid in a pressure-bottle. Gentle warming was employed and solution was complete at about 50°. Twenty g. (about 0.4 mole) of 96% sodium cyanide was then added and the bottle was closed and swirled to dissolve. The temperature rose to 60-70° and the bottle was placed beside the steam-bath and allowed to stand 17 hours. It was then at about 30° C. and the solution was filled with a mass of colorless crystals. The bottle was opened and the contents were filtered under the hood. The solid weighed 17 g. when dry and melted at 93–95° C.

The filtrate was diluted to 1 liter with cold water. An oil separated which crystallized readily and was collected and washed with water.

For purification the two fractions of nitrile were dissolved in ether, washed with water, sodium bicarbonate solution and again with water. The solution was dried over potassium carbonate and light petroleum-ether was added. About 0.5 g. of orange-colored crystals separated first. These were collected and identified as xanthone (presumably present in the starting xanthydrol). On the addition of more petroleum-ether to the mother-liquor the pure nitrile separated as colorless crystals melting at 97–98°. The yield was 33 g. or 80%.

Example IV

Twenty g. (0.1 mole) of xanthydrol was suspended in 150 cc. of glacial acetic acid in a 3-neck flask with stirrer and reflux-condenser, and a thermometer dipping into the solution. After a few minutes stirring the xanthydrol had all dissolved: the temperature was now 25°. In one portion there was now added 10 g. (0.2 mole) of 96% sodium cyanide. In about 10 minutes, the temperature had risen to 41°, thereafter the temperature began to fall. Since not all the cyanide had dissolved, the temperature was raised to 55° and maintained at 45–60° for 5 hours. The reaction mixture was then allowed to stand over-night and to cool to room temperature.

In the morning the solution was cooled to 15° C. and seeded with a little 9-cyanoxanthene. There separated a quantity of cyanoxanthene which was filtered and washed repeatedly with cold water. After drying this crop weighed 8.3 g. and melted at 96–98°.

The filtrate was diluted with water and two further crops of 9-cyanoxanthene were obtained. The second crop weighed 7.3 g. and melted at 94°; the third crop weighed 2.7 g. and melted at 78°. The first two crops together represent a 75% yield.

Example V

Twenty g. of xanthydrol was suspended in 75 cc. of glacial acetic acid in the same apparatus used in Example IV. (This experiment was run in February and the condenser water was about 4° C. If it were to be repeated in the summer it would be advisable to pass the tap-water through an ice-bath on the way to the condenser.) The solution was stirred and warmed to 55° C. at which temperature only about 0.5 g. of solid remained undissolved. Ten g. of sodium cyanide was added in one portion. The temperature rose without external heating to 90° and there was considerable refluxing. Thereafter the temperature fell and after 35 minutes was 50°. At this time the contents of the reaction-flask was a mass of crystals and stirring was no longer effective. The flask was allowed to stand and cool for 1½ hours and the contents were then filtered and washed with cold water. By dilution of the filtrate was obtained a second crop only slightly less pure. The combined crops weighed 18 g.

This application is a continuation-in-part of Serial No. 344,463, filed March 24, 1953, now abandoned.

What we claim is:

1. The method of preparing 9-cyanoxanthene which comprises reacting xanthydrol with an alkali cyanide in solution of a lower saturated fatty acid.

2. The method of preparing 9-cyanoxanthene which comprises reacting xanthydrol with an alkali cyanide in solution of a lower saturated fatty acid at a temperature not substantially over 100°.

3. The method of preparing 9-cyanoxanthene which comprises reacting xanthydrol with an alkali cyanide in solution of a lower saturated fatty acid at a temperature between 25° and 90° C.

4. The method of preparing 9-cyanoxanthene which comprises reacting xanthydrol with an alkali cyanide in solution of acetic acid.

5. The method of preparing 9-cyanoxanthene which comprises reacting xanthydrol with an alkali cyanide in solution of acetic acid at a temperature not substantially over 100°.

6. The method of preparing 9-cyanoxanthene which comprises reacting xanthydrol with an alkali cyanide in solution of acetic acid at a temperature between 25° and 90° C.

7. 9-cyanoxanthene.

(References on following page)

References Cited in the file of this patent

UNITED STATES PATENTS

| | | |
|---|---|---|
| 1,367,898 | Straus | Feb. 8, 1921 |

FOREIGN PATENTS

| | | |
|---|---|---|
| 38,577 | France | Mar. 24, 1931 |
| 463,123 | Germany | July 23, 1928 |

OTHER REFERENCES

Kurtz-Annalen, vol. 572, pp. 69–70 (1951).
Pope et al.: J. Chem. Soc., vol. 99, pp. 548–551 (1911).
The Merck Index (Sixth Edition), p. 1012 (1952).